US011157219B1

(12) United States Patent
    Morales

(10) Patent No.: US 11,157,219 B1
(45) Date of Patent: Oct. 26, 2021

(54) METHOD AND SYSTEM FOR ESTIMATING PRINTER CONSUMABLES

(71) Applicant: KYOCERA Document Solutions Inc., Osaka (JP)

(72) Inventor: Javier A. Morales, Rochester, NY (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/904,321

(22) Filed: Jun. 17, 2020

(51) Int. Cl.
  *G06F 3/12* (2006.01)
  *G06Q 10/06* (2012.01)

(52) U.S. Cl.
  CPC .......... *G06F 3/1219* (2013.01); *G06F 3/1235* (2013.01); *G06F 3/1275* (2013.01); *G06F 3/1288* (2013.01); *G06Q 10/06315* (2013.01)

(58) Field of Classification Search
  None
  See application file for complete search history.

(56) References Cited

U.S. PATENT DOCUMENTS

| 5,592,298 | A | 1/1997 | Caruso | |
|---|---|---|---|---|
| 6,356,359 | B1 | 3/2002 | Motamed | |
| 6,793,305 | B2 | 9/2004 | Tsukada et al. | |
| 6,801,333 | B1 | 10/2004 | Weiss | |
| 8,734,034 | B2 | 5/2014 | Morovic et al. | |
| 10,549,523 | B2* | 2/2020 | Stanich | H04N 1/00034 |
| 2010/0253968 | A1* | 10/2010 | Nuggehalli | G06F 3/1285 358/1.15 |
| 2012/0236342 | A1* | 9/2012 | Price | G06F 3/126 358/1.13 |
| 2013/0101328 | A1* | 4/2013 | Morovic | H04N 1/33315 400/76 |
| 2013/0110744 | A1* | 5/2013 | Hendley | G06Q 10/06 705/413 |
| 2013/0321827 | A1* | 12/2013 | Liebelt | H04N 1/46 358/1.9 |
| 2014/0085665 | A1* | 3/2014 | Sheldon | G06F 3/1205 358/1.15 |
| 2014/0233055 | A1* | 8/2014 | Eizenberg | G06F 3/1208 358/1.15 |
| 2018/0001653 | A1* | 1/2018 | Tremblay | G03G 15/556 |
| 2019/0050182 | A1* | 2/2019 | Wozniak | G06F 3/1285 |

* cited by examiner

*Primary Examiner* — Henok Shiferaw
(74) *Attorney, Agent, or Firm* — GrowIP Law Group LLC

(57) ABSTRACT

A computer-implemented method includes receiving, by a computer, equipment parameters associated with printing equipment of a printing system. The computer determines that the equipment parameters are different from previous equipment parameters used by the printing equipment. When the equipment parameters are different, the computer configures estimation logic to generate an estimated amount of printer consumables required for printing pages of a print job request based on the equipment parameters; and communicates the estimated amount of printer consumables required for printing the pages of the print job request to a client terminal.

14 Claims, 9 Drawing Sheets

Quote Records
200

| ID | Client information | Job information | Front-end parameters | Print engine parameters | Consumables estimate | Cost estimate |
|---|---|---|---|---|---|---|
| 1 | Client A | 100k pages per month | P1=X, P2=Y | P1=E, P2=F | 10C, 5M, 10Y, 12K | $0.15 |
| 2 | Client B | 150k pages per month | P1=A, P2=B | P1=G, P2=H | 10C, 5M, 10Y, 12K | $0.11 |
| ⋮ | ⋮ | ⋮ | ⋮ | ⋮ | ⋮ | ⋮ |

*Fig. 2*

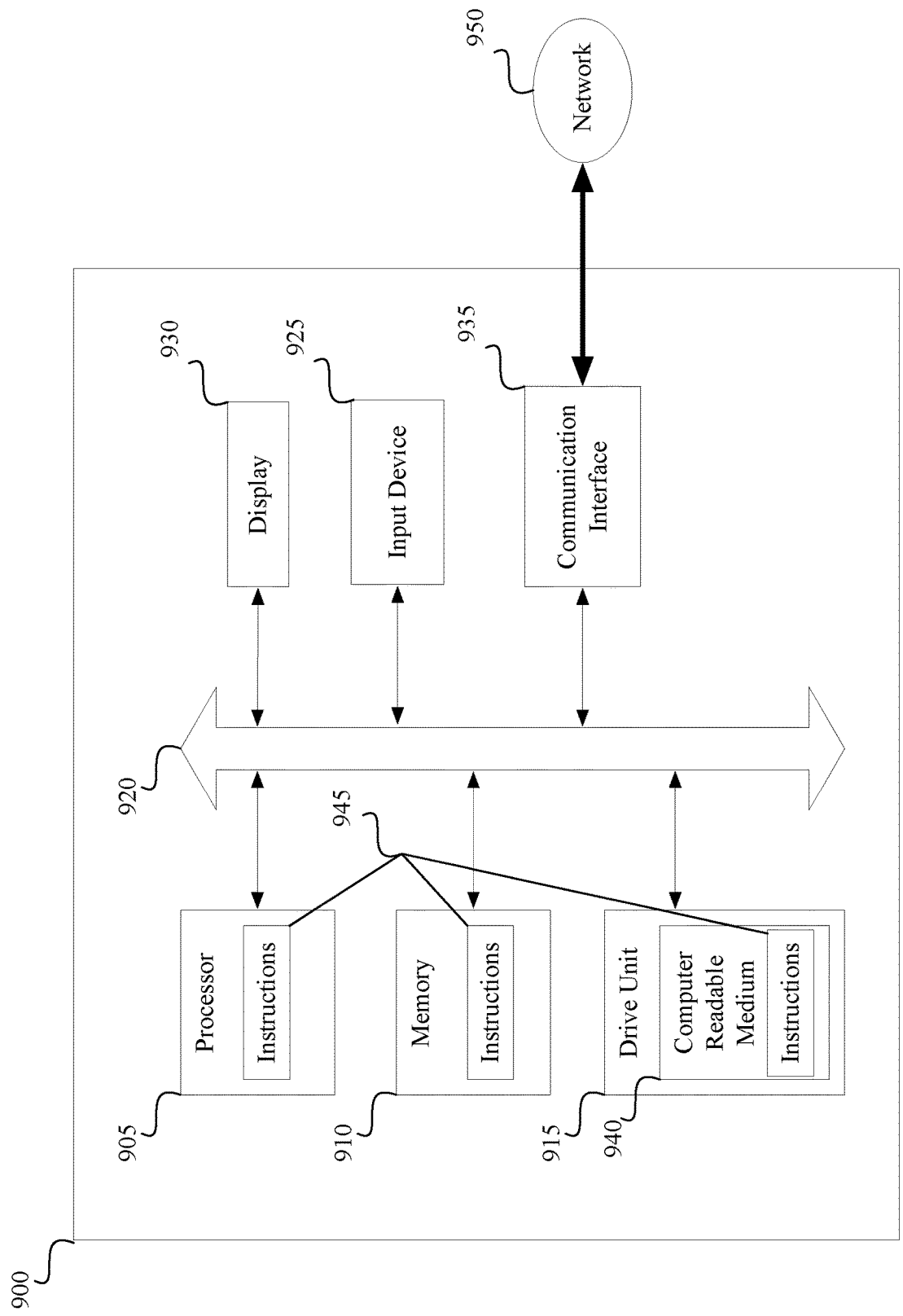

METHOD AND SYSTEM FOR ESTIMATING PRINTER CONSUMABLES

BACKGROUND

Field

This application generally relates to printing services. In particular, this application describes a method and system for estimating printer consumables required by a printing system.

Description of Related Art

Estimating the amount of printer consumables required for a particular print job is an important consideration for printing services. For example, a printing service can provide services to a client that can have thousands of customers (e.g., an acquiring bank associated with credit/debit cards). The client can enter into a contract with the printing service to have statements printed and sent (e.g., via mail) to the client's customers. Terms of the contract can specify, for example, a cost per print job or a cost per page (e.g., one cent per page).

Determination of the cost can involve estimating the amount of printer consumables that will be consumed in processing the print job. In some cases, the printing service can estimate this amount by printing a limited number of sample pages that are representative of the larger print job. The amount of printer consumables consumed during this limited run can be used as the basis for determining the cost for the entire print job.

SUMMARY

In a first aspect, a computer-implemented method includes receiving, by a computer, equipment parameters associated with printing equipment of a printing system. The computer determines that the equipment parameters are different from previous equipment parameters used by the printing equipment. The computer configures estimation logic to generate an estimated amount of printer consumables required for printing pages of a print job request based on the equipment parameters in response to determining that the equipment parameters are different. The computer then communicates the estimated amount of printer consumables required for printing the pages of the print job request to a client terminal.

In a second aspect, a system includes a network interface, a memory, and a processor. The processor is in communication with the memory and the network, and the memory can store instruction code. The instruction code is executable by the processor to cause the processor to perform operations that include receiving equipment parameters associated with printing equipment of a printing system. The processor determines that the equipment parameters are different from previous equipment parameters used by the printing equipment. The processor configures estimation logic to generate an estimated amount of printer consumables required for printing pages of a print job request based on the equipment parameters in response to determining that the equipment parameters are different. The processor then communicates the estimated amount of printer consumables required for printing the pages of the print job request to a client terminal.

In a third aspect, a non-transitory computer-readable medium having stored thereon instruction code is provided. When the instruction code is executed by a processor, the processor performs operations that include receiving equipment parameters associated with printing equipment of a printing system. The processor determines that the equipment parameters are different from previous equipment parameters used by the printing equipment. Responsive to determining that the equipment parameters are different, the processor configures estimation logic to generate an estimated amount of printer consumables required for printing pages of a print job request based on the equipment parameters; and communicates the estimated amount of printer consumables required for printing the pages of the print job request to a client terminal.

In a fourth aspect, a computer-implemented method includes receiving, by a computer, equipment parameters associated with printing equipment of a printing system. The computer determines that the equipment parameters are different from previous equipment parameters used by the printing equipment. The computer communicates an alert to an operator that indicates that the equipment parameters are different in response to determining that the equipment parameters are different.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

FIG. 2 illustrates quote records that can be stored in the quote database of an estimation system of the environment, in accordance with an example.

FIG. 9 illustrates a computer system that can form part of or implement any of the systems or devices of the environment, in accordance with an example.

DETAILED DESCRIPTION

Figure 1:
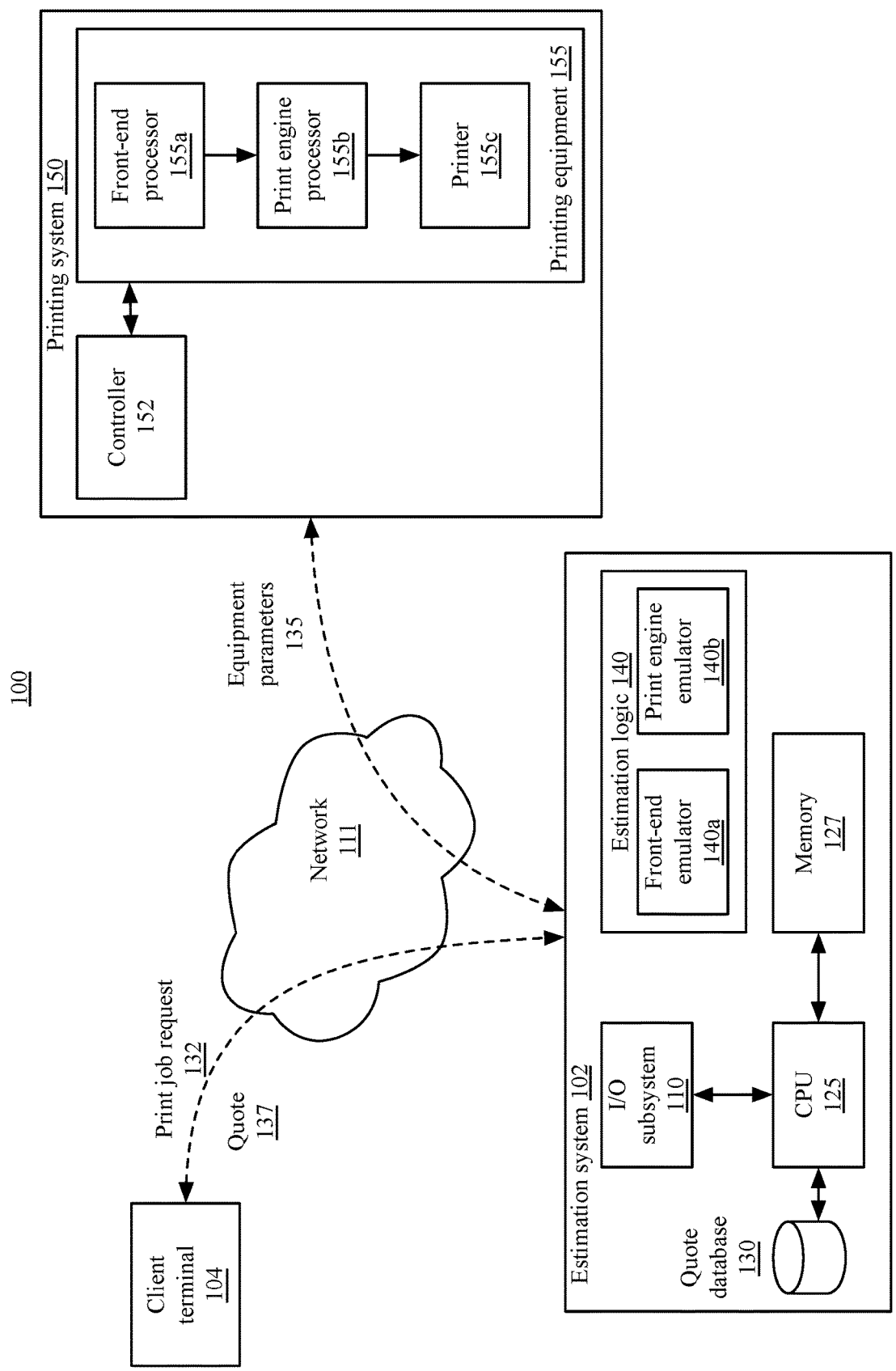
FIG. 1 illustrates an environment that includes various entities that cooperate to facilitate estimating printer consumables, in accordance with an example.

Implementations of this disclosure provide technological improvements that are particular to printing technology, such as those related to reducing the amount of printer consumables used by a printing system. In this regard, equipment parameters of a printing system that can control the amount of printer consumable required to process a particular print job request can be compared to equipment parameters that were used by an estimation system in providing an estimate associated with the print job request. When a mismatch is determined between the equipment parameters associated with the estimate and the equipment parameters used by the printing system, the equipment parameters of the printing system can be updated to reduce the amount of printer consumables required by the printing system to process the print job request.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein, are meant that the recited characteristic, parameter, or value need not be achieved exactly, but that deviations or variations, including, for example, tolerances, measurement error, measurement accuracy limitations and other factors known to one skilled in the art, may occur in amounts that do not preclude the effect the characteristic was intended to provide.

I. Introduction

As noted above, in some instances, a printing service can estimate the cost for a particular print job request based on the cost associated with printing a subset or sample of the print job request. The estimate determined for a particular print job request can depend on various equipment parameters of the printing system used by the printing service. These equipment parameters can impact the amount of printer consumables required by the printing system. For example, the printing equipment can include a front-end image processor (FEP), a print engine processor (PEP), and one or more printers. The FEP can be configured to convert bitmap images, vector graphics, fonts, etc., associated with pages specified in the print job request to bitmap/rasterized representations of the pages (e.g., C, M, Y, and K pixels). The sum of the values of pixels of a particular color in the rasterized pages can be proportional to the amount of printer consumables (e.g., ink, toner, etc.) required to print that color. To lower printer consumable usage, the FEP can be configured via image rasterization parameters of the equipment parameters to, for example, reduce the density for each colorant, convert color images to black and white, adjust tone reproduction curves to lower printer consumable usage. Gray component replacement levels can be adjusted via the equipment parameters to reduce printer consumables. ICC profiles can be configured via the equipment parameters to change how colors are converted for printing to thereby reduce printer consumables usage. As described in further detail below, equipment parameters of the PEP can also be adjusted to further lower printer consumable usage.

In some instances, the equipment parameters associated with the printing equipment can change between the time the estimate is provided and the printing of the larger print job. Differences between the equipment parameters can result in more printer consumable usage than was previously estimated and, therefore, can impact that cost to the printing service.

Examples of an estimation system and estimation method that can alleviate these issues are described below. One example of the estimation system can include estimation logic. The estimation logic can include a front-end emulator (FE) and a print engine emulator (PE) configured to emulate operations performed by the FEP and the PEP of the printing system, respectively. In this regard, the FE and the PE of the estimation logic can be configured with equipment parameters 135 that match the equipment parameters associated with the FEP and the PEP, respectively. The estimation logic can be further configured to estimate the amount of printer consumables required by the printing system.

In operation, the estimation logic can monitor the equipment parameters of the printing system for any changes. This can facilitate real-time configuration of the FE and the PE of the estimation logic with corresponding equipment parameters utilized by the printing equipment of the printing system.

The estimation system can be further configured to store the equipment parameters used by the estimation logic when providing a particular estimate for a print job request. The stored equipment parameters can be compared with the printing system equipment parameters when printing of the print job is about to commence. In some instances, if the stored parameters do not match the printing system equipment parameters, the printing system equipment parameters can be adjusted to match the stored equipment parameters.

FIG. 1 illustrates an example of an environment 100 that includes various entities that cooperate to facilitate estimating printer consumables. Example entities of the environment 100 can include an estimation system 102, a client terminal 104, and a printing system 150. The various entities of the environment 100 can be configured to communicate with one another via a network 111, such as the Internet.

The printing system 150 can include a controller 152 and printing equipment 155. An example of the controller 152 can be configured to coordinate operations performed the printing equipment 155. For example, the controller 152 can be configured to receive print job requests 132 from entities outside of the printing system 150 and to communicate the print job requests 132 to the printing equipment 155. As described in more detail below, the controller 152 can be further configured to monitor equipment parameters 135 associated with the printing equipment 155 and to communicate this information to the estimation system 102.

As noted above, the printing equipment 155 can include an FEP 155a, a PEP 155b, and one or more printers 155c. The FEP 155a can be configured to convert bitmap images, vector graphics, fonts, etc., associated with pages specified in the print job request to a bitmap/rasterized representation of the image (e.g., C, M, Y, and K pixels). The manner in which the FEP 155a rasterizes the pages specified in the print job request can depend on various image rasterization parameters of the FEP 155a. For example, these image rasterization parameters may include and/or effect calibration curves, paper definitions, international color consortium profiles (ICC profiles), spot color definitions, tone adjustment curves, color conversion settings, colorant limits (e.g., ink, toner), rendering intent, K preservation, CGR level, etc., max colorant densities, print margin, and/or halftones.

An example of the PEP 155b can be included or in communication with the printer 155c. The printer 155c can correspond to an industrial printer capable of printing thousands of pages an hour. In this regard, the printer 155c can be ink-based, toner-based, or can used a different medium. The PEP 155b can include various parameters that can control the operation of the printer 155c, and, therefore, the amount of printer consumables required by the printer. Within examples, these parameters can include printer maintenance parameters that can control and/or effect head cleaning intervals, head clogging prevention intervals, etc., of the printer 155c, spitting (i.e., printing spray pattern over all content), the printing of purge sheets, the printing of spit lines (i.e., lines printed between page frames in a roll-fed printer to ensure that all jets of the print head of the printer fire).

An example of the estimation system 102 can correspond to a computer, tablet, and/or any other device that facilitates user interactions. The estimation system 102 can include a memory 127 and a processor 125. The estimation system 102 can include other subsystems. Within examples, these subsystems can include an input/output (I/O) subsystem 110, a quote database 130, and estimation logic 140. Details related to the various subsystems of the estimation system 102 and the operations performed by these subsystems are described in further detail below.

The processor 125 is in communication with the memory 127. The processor 125 is configured to execute instruction code stored in the memory 127. The instruction code facilitates performing, by the estimation system 102, various operations that facilitate estimating consumables that may be required by the printing system 150. In this regard, the instruction code can cause the processor 125 to control and coordinate various activities performed by the different subsystems of the estimation system 102. The processor 125 can correspond to a stand-alone computer system such as an Intel®, AMD®, or ARM® based computer system or a different computer system and can include application-specific computer systems. The computer system can include an operating system, such as Microsoft Windows®, Linux, Unix®, Mac OS®, or a different operating system.

An example of the I/O subsystem 110 can include one or more input, output, or input/output interfaces and is configured to facilitate communications with entities outside of the estimation system 102. In this regard, an example of the I/O subsystem 110 can be configured to dynamically determine the communication methodology utilized by entities of the environment 100 and can communicate information to the entities with an interface that uses a determined communication methodology. For example, the I/O subsystem 110 can determine that a first entity utilizes a RESTful API and can, therefore, communicate with the entity using an interface that uses a RESTful communication methodology.

An example of the estimation logic 140 can be configured to estimate the amount of printer consumables required by a printer 155c in processing a particular print job request 132. In this regard, the estimation logic 140 can implement the FE 140a and the PE 140b described above. The FE 140a and the PE 140b can be configured with equipment parameters 135 that match the equipment parameters 135 associated with the FEP 154 and the PEP 155b of the printing system 150.

As noted above, the FE 140a can be configured to emulate operations performed by the FEP 155a of the printing system 150, which can depend on various parameters. For example, the FE 140a can be configured to convert bitmap images, vector graphics, fonts, etc., specified in sample pages of a print job request 132 to bitmap/rasterized representations of the pages (e.g., C, M, Y, and K pixels). The manner in which FE 140a performs the conversion can depend on various image rasterization parameters of the FE 140a, which can correspond to the image rasterization parameters of the FEP 155a described above.

An example of the PE 140b can be configured to emulate operations performed by the PEP 155b and/or the printer 155c of the printing system 150, which can depend on various printer maintenance parameters, which can correspond to the printer maintenance parameters of the PEP 155b described above.

It is contemplated that any of the subsystems referenced herein can correspond to a stand-alone computer system such as an Intel®, AMD®, or Arm® based computer system or a different computer system and can include application-specific computer systems. The computer systems can include an operating system, such as Microsoft Windows®, Linux, Unix®, or another operating system. It is also contemplated that operations performed by the various subsystems can be combined into a fewer or greater number of subsystems to facilitate speed scaling, cost reductions, etc.

FIG. 2 illustrates examples of quote records 200 that can be stored in the quote database 130. Each entry in quote database 130 can specify aspects associated with an estimate provided to a client for processing a particular print job request 132. Within examples, fields 205 of each entry in the quote database 130 can include an ID field 205a, a client information field 205b, a job information field 205c, an FE parameters field 205d, a PE parameters field 205e, a consumables estimate field 205f, and a cost field 205g. Other information can be specified in the quote records 200.

The ID field 205a of each entry can specify a unique value for each entry. The value of the ID field 205a can be automatically generated with each new entry in the quote database 130. Additionally, the value for the ID field 205a can be manually specified.

The client information field 205b of each entry can specify, for example, the name, address, phone number, email address, etc., associated with a particular client. As noted above, a particular client can submit a request for a quote for a particular print job request 132 via the client terminal 104. The request can include one or more sample pages associated with the print job request 132 (e.g., 100 random pages of a 1,000,000 page print job). Information in this field can facilitate communicating the quote 137 to the client terminal 104. At a later time, the client can communicate the entire print job request 132.

The job information field 205c of each entry can specify information indicative of the print job request 132. Within examples, the value for this field can specify information indicative of the size of the print job request 132 (e.g., 100k pages, 1 GByte). The value can specify the frequency at which the print job request 132 should be processed (e.g., monthly, bi-monthly). In some cases, the value for this field can further specify information indicative of the size of the sample that is/was used to generate the estimate (e.g., 100 pages, 1 Kbyte). Other information that further specifies the print job request 132 can be represented by the value of this field.

The front-end parameters field 205d of each entry can specify one or more values associated with various equipment parameters 135 that were utilized by the FE 140a of the estimation logic 140 in generating the estimate associated with the entry. These values can specify the image rasterization parameters described above.

The print engine parameters field 205e of each entry can specify one or more values associated with various equipment parameters 135 that were utilized by the PE 140b of the estimation logic 140 in generating the estimate associated with the entry. These parameters can specify the printer maintenance parameters described above.

The consumables estimate field 205f of each entry can specify information indicative of the amount of printer consumables (e.g., the amount of cyan, magenta, yellow and black ink) estimated to be required for a particular print job request 132. For example, the value for this field can specify the number of units (e.g., picoliter) of a particular color required for a particular print job request 132. The estimated values specified in this field can be specified in terms of the entire print job request 132, per page, etc.

The cost estimate field 205g of each entry can specify the cost associated with the print job request 132. The value of this field can be proportional to the value of the consumable estimate specified in the entry and the type of media (e.g., ink, toner) used by the printer 155c. The cost can be specified in terms of the entire print job request 132, per page, etc.

FIGS. 3-5, and 7 illustrate examples of operations that can be performed by the estimation system 102 and/or the controller 152 of the printing system 150. It should be understood that one or more of the operations can be implemented in instruction code that can be stored in the memory of the respective systems. The instruction code can be executed by one or more processors of these systems, alone or in combination with other subsystems of these systems, to cause the respective systems to perform the operations illustrated in the figures.

Figure 3:
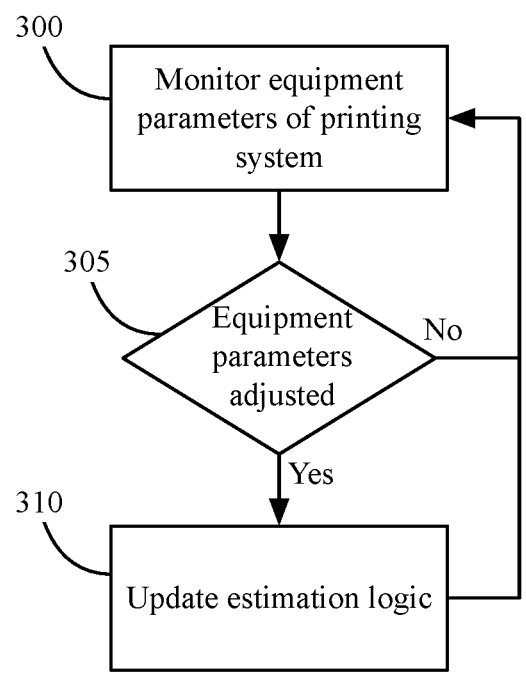
FIG. 3 illustrates operations that facilitate updating estimation logic of the estimation system with equipment parameters associated with printing equipment of a printing system, in accordance with an example.

FIG. 3 illustrates examples of operations that facilitate updating estimation logic 140 of the estimation system 102 with equipment parameters 135 associated with printing equipment 155 of the printing system 150. One or more of these operations can be performed by the estimation system 102 and/or the controller 152 of the printing system 150.

Operations at block 300 can involve monitoring equipment parameters 135 of the printing system 150. For example, the controller 152 of the printing system 150 can be configured to monitor/poll the printing equipment 155 of the printing system 150 (i.e., the FEP 155a and/or the PEP 115b) for any adjustments to equipment parameters 135 of these systems. When adjustments are detected, the controller 152 can communicate information indicative of the adjusted equipment parameters 135 to the estimation system 102.

In another example, the printing equipment 155 can use push communication technology to communicate equipment parameters 135 when adjustments to equipment parameters 135 occur. For example, an operator of the printing system 150 may change a parameter of the FEP 155a and/or the PEP 155b. The corresponding system can responsively communicate information indicative of the adjusted parameter to the controller 152. The controller 152 can then communicate information indicative of the adjusted printing parameter to the estimation system 102. In some examples, the printing equipment 155 can be directly networked to the estimation system 102 to facilitate directly communicating this information to the estimation system 102.

In yet other examples, the estimation system 102 can periodically communicate a request for printing parameter information to the controller 152 and/or the printing equipment 155 (i.e., the FEP 155a, and/or the PEP 155b).

Operations at block 305 can involve determining whether the equipment parameters 135 determined above are different from the equipment parameters 135 used by the estimation logic 140. If the equipment parameters 135 are the same, then the operations at block 300 can be repeated. In some examples, the operations at block 300 can be repeated when the equipment parameters 135 associated with the printing equipment and the equipment parameters 135 used by the estimation logic 140 are within a threshold extent of one another.

If the equipment parameters 135 associated with the printing equipment have changed or changed beyond a threshold extent, then the operations at block 310 can commence. For example, the estimation logic 140 can be configured to use the equipment parameters 135 associated with the printing equipment to estimate the amount of printer consumables. More specifically, the FE 140a and PE 140b of the estimation logic 140 can be configured with the corresponding equipment parameters 135 associated with the printing equipment 155 of the printing system 150. In some examples, if the equipment parameters 135 associated with the printing equipment have changed or changed beyond a threshold extent, an alert can be generated to an operator, and the operator can take appropriate actions to update the estimation logic and/or the parameters of the printing system.

Figure 4:
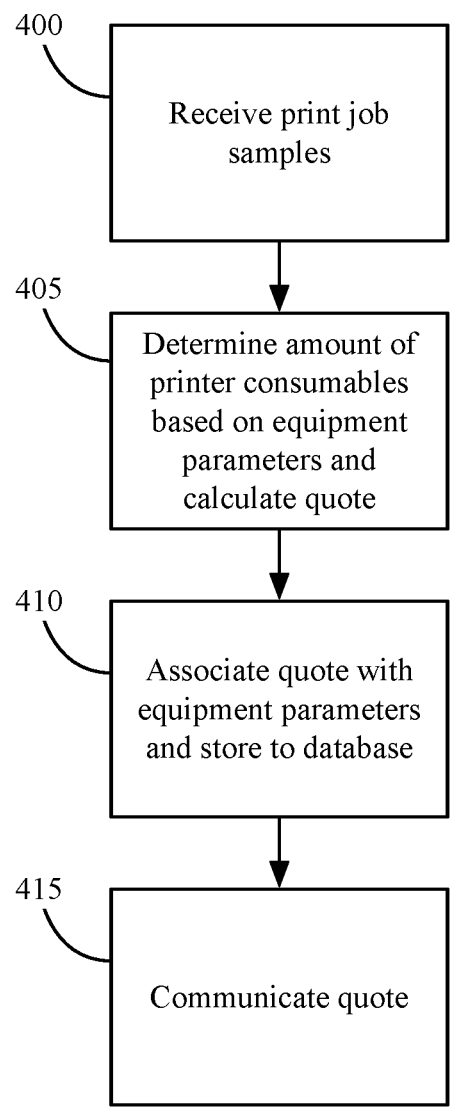
FIG. 4 illustrates operations performed by the estimation system for generating a quote for a client, in accordance with an example.

FIG. 4 illustrates examples of operations performed by the estimation system 102 for generating a quote for a client. Operations at block 400 can involve receiving, by the estimation system 102, samples associated with a print job request 132. For example, a client can, via the client terminal 104, upload sample pages (e.g., one hundred randomly selected pages) that are representative of the print job request 132.

Operations at block 405 can involve determining the amount of printer consumables associated with the samples. For example, the samples can be processed by the FE 140a and the PE 140b of the estimation logic 140. In this regard, the FE 140a can convert bitmap images, vector graphics, fonts, etc., associated with the sample pages to a bitmap/rasterized representation of the sample pages (e.g., C, M, Y, and K pixels) according to image rasterization parameters of the equipment parameters 135 associated with the FE 140a. The rasterized sample pages can be communicated to the PE 140b, which can further process the rasterized sample pages according to printer maintenance parameters of the equipment parameters 135 associated with the PE 140b. Afterward, the estimation logic 140 can determine the amount of printer consumables that would be required to print the rasterized sample pages. For example, as noted above, the sum of the values of the pixels of a particular color in the rasterized sample pages can be proportional to the amount of printer consumables (e.g., ink, toner, etc.) required to print that color.

Operations at block 410 can involve updating the quote database 130 with the information determined above. For example, an entry can be added to the quoted database 130 that specifies the client, job information associated with the request, equipment parameters 135 used by the estimation logic 140 in determining the estimate, and information indicative of the amount of printer consumables required to print the print job request 132.

Operations at block 415 can involve communicating the quote 137 to the client. For example, the estimation system 102 can communicate and email with the quote 137 to the client terminal 104.

Figure 5:
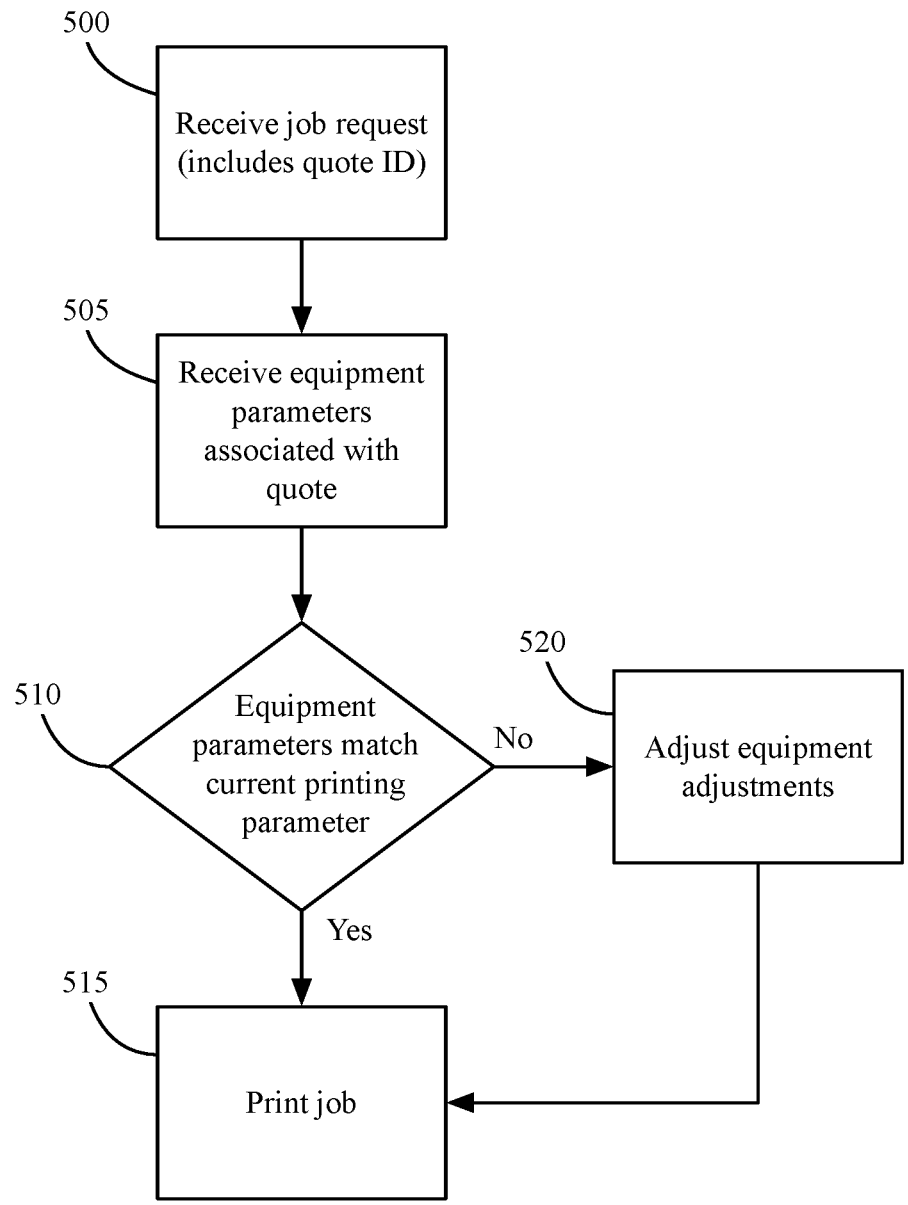
FIG. 5 illustrates operations that can be performed by the estimation system and/or a controller of the printing system when receiving a print job request, in accordance with an example.

FIG. 5 illustrates examples of operations that can be performed by the estimation system 102 and/or the controller 152 of the printing system 150 when receiving a print job request 132. Operations at block 500 can involve receiving a print job request 132. For example, a client can, via the client terminal 104, communicate a print job request 132 that is associated with a quote specified in the quote database 130. An example of the print job request 132 can specify thousands of pages to be printed. An example of the print job request 132 can further specify the ID 205a associated with the quote record 200, which can facilitate locating the quote record 200 within the quote database 130. In one example, the print job request 132 can be communicated directly to the controller 152 of the printing system 150. In another example, the print job request 132 can be communicated to the estimation system 102, which can, in turn, communicate the print job request 132 to the controller 152 of the printing system 150.

Operations at block 505 can involve receiving equipment parameters 135 specified in the corresponding quote entry. For example, the estimation system 102 can retrieve the value(s) for the front-end parameters field 205d and the value(s) for the print engine parameters field 205e associated with the quote entry from the quote database 130.

Operations at block 510 can involve determining whether the equipment parameters 135 received from the quote database 130 match the corresponding equipment parameters 135 associated with the printing equipment 155 of the printing system 150. If the equipment parameters 135 match, then at block 515, the print job request 132 associated with the quote can be printed by the printing system 150. For example, pages in the print job request 132 can be processed by the FEP 155a and the PEP 155b of the printing system 150, and the processed pages can be communicated to one or more printers 155c of the printing system 150.

If at block 510, the equipment parameters 135 do not match, then at block 520, an alert can be communicated to an operator of the printing system 150 to adjust the equipment parameters 135 associated with the printing equipment 155 to those associated with the print job request 132. In some examples, these equipment parameters 135 can be communicated automatically to the printing equipment 155.

Figure 6:
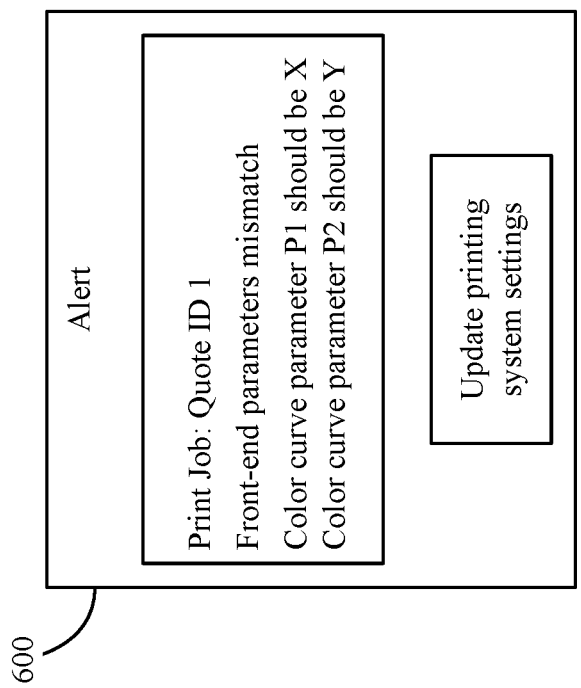
FIG. 6 illustrates a user interface that can be generated by the estimation system and/or the controller of the printing system to facilitate alerting an operator of a mismatch in the equipment parameters associated with the printing equipment, in accordance with an example.

FIG. 6 illustrates an example of a user interface 600 that can be generated by the estimation system 102 and/or the controller 152 of the printing system 150 to facilitate alerting an operator of a mismatch in the equipment parameters 135 associated with the printing equipment 155. Referring to FIG. 6, an example of the user interface 600 can specify information indicative of the print job request 132, such as the quote ID 205a (e.g., Print Job: Quote ID 1). The user interface 600 can further specify information such as a listing of equipment parameters 135 that are mismatched. For example, the user interface 600 can specify the particular printing equipment 155 (e.g., Front-end) and the equipment parameters 135 of that equipment 155 (e.g., Color curve parameters P1 and P2) that are mismatched. The user interface 600 can further specify the value(s) of the printing parameter(s) specified in the quote record 200 for that piece of equipment. Upon receiving the alert, an operator of the printing system 150 can update the printing equipment associated with the mismatched parameters so that the equipment parameters 135 match those equipment parameters 135 associated with the print job request 132.

In some examples, the user interface 600 can include an update control that can be selected by the operator to cause the estimation system 102 and/or the controller 152 of the printing system 150 to update the parameters that are mismatched. For example, the selection of the update control can cause values associated with the front-end parameters field 205d that do not match the equipment parameters 135 associated with the FEP 155a to be communicated to the FEP 155a.

Returning to FIG. 5, after the mismatched equipment parameters 135 are adjusted, the print job request 132 can be printed at block 515.

Figure 7:
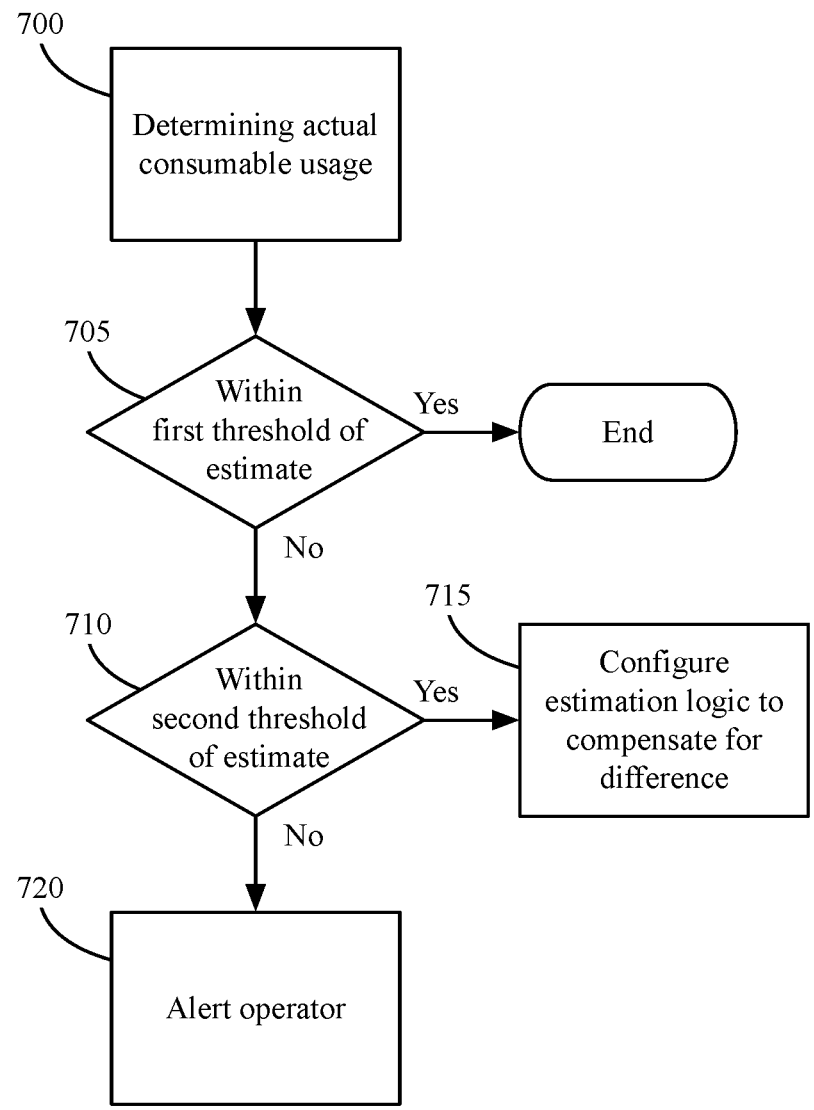
FIG. 7 illustrates operations that can be performed by the estimation system and/or the controller of the printer service after a print job request has been fulfilled, in accordance with an example.

FIG. 7 illustrates examples of operations that can be performed by the estimation system 102 and/or the controller 152 of the printer system 150 after a print job request 132 has been fulfilled. Operations at block 700 can involve determining the actual amount of printer consumable usage after the print job request 132 has been fulfilled. For example, the printer 155c of the printing system 150 can be queried to determine the amount of printer consumables that were required by the printer 155c. In one example, the printer 155c can be automatically queried by the controller 152. In another example, an operator can determine the amount of printer consumables that were required by the printer 155c and can specify the information to the controller 152.

Operations at block 705 can involve determining whether the amount of printer consumables that were required by the printer are within a first threshold extent (e.g., within 5%) of the consumable estimate 205f specified in the quote that is associated with the print job request 132. If the amount of printer consumables are within a threshold extent, then the operations may end.

If at block 705, the amount of printer consumables that were required by the printer 155c are not within the first threshold extent, but at blocks 715, the amount of printer consumables are determined to be within a second threshold extent (e.g., 10%), then the operations at block 715 can commence.

Operations at block 715 can involve configuring the estimation logic 140 of the estimation system 102 to compensate for the differences determined above. For example, a new print job request can be received from a client. The estimation logic 140 can estimate the amount of printer consumables for the new print job request as before. For example, the estimation logic 140 can process one or more samples pages of the print job request 132 via the FE 140a and PE 140b to estimate the amount of printer consumables that would be consumed. The estimation logic 140 can subsequently adjust the estimated amount of printer consumables (e.g., increase by 10%) to compensate for the differences determined above. The values for the consumable estimate field 205f and the cost estimate fields cost 205g specified in the corresponding quote entry associated with the print job request can be specified accordingly and communicated to the client terminal 104.

If at block 710, the amount of printer consumables required by the printer 155c is not within the second threshold extent, then operations at block 720 can commence.

Operations at block 720 can involve communicating an alert to an operator of the printing system 150 to determine the issue causing the difference between the actual and estimated amount of printer consumables required by the printer 155c. For example, the amount of ink, toner, etc., applied by a print head, toner device, etc., can vary to a degree. Environmental factors such as temperature and humidity can further affect these aspects. Additionally, the color response of the printer can drift to a degree such that the amount of, for example, the ink used for a specific input value may change over time. In some cases, one or more of these issues can be mitigated via adjustment of the printer calibration/TRC that is applied to the printer, which can be utilized to ensure consistent color reproduction. The operator can take appropriate steps to correct the issues in response to receiving the alert.

Figure 8:
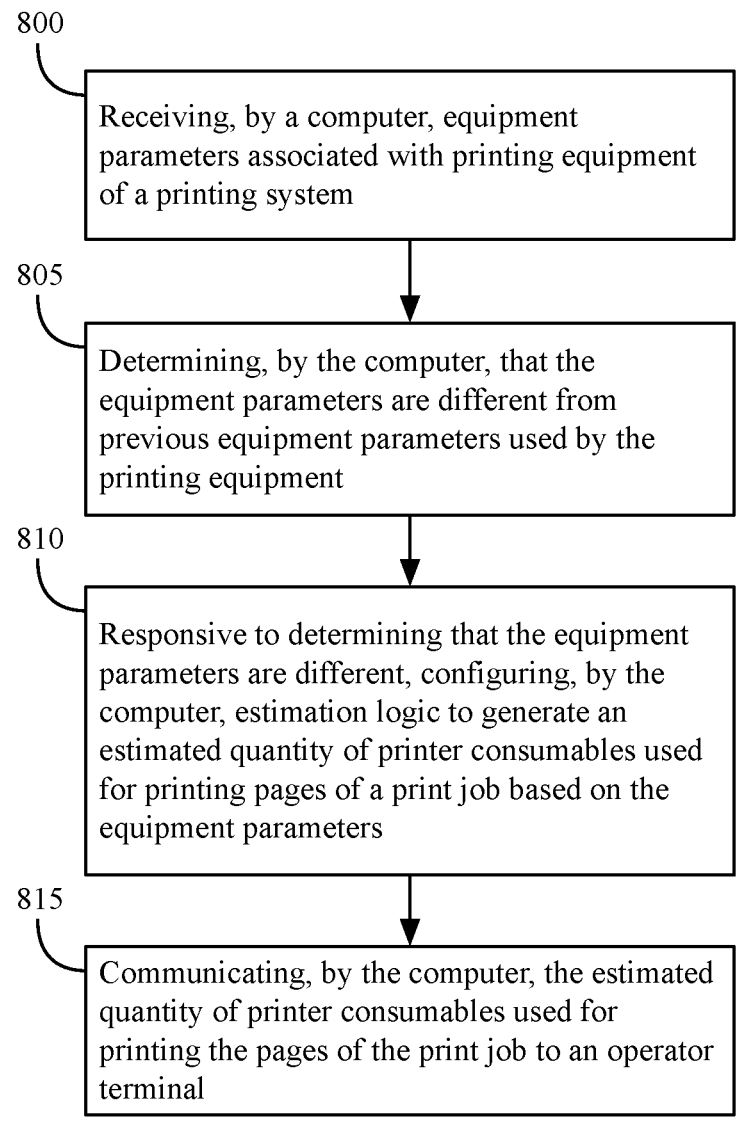
FIG. 8 illustrates a computer-implemented method that can be performed by one or more of the systems described above, in accordance with an example.

FIG. 8 illustrates an example of a computer-implemented method that can be performed by one or more of the examples described above. Block 800 can involve receiving, by a computer, equipment parameters 135 associated with printing equipment of a printing system 150.

Block 805 can involve determining, by the computer, that the equipment parameters 135 are different from previous equipment parameters 135 used by the printing equipment.

Block 810 can involve configuring, by the computer, estimation logic to generate an estimated amount of printer consumables required for printing pages of a print job request based on the equipment parameters 135 when the equipment parameters 135 are determined to be different.

Block 815 can involve communicating, by the computer, the estimated amount of printer consumables required for printing the pages of the print job request to a client terminal.

In some examples, the equipment parameters 135 specify one or more of the image rasterization parameters and/or the printer maintenance parameters described above.

In some examples, the estimation logic is configured to rasterize one or more pages of the print job request according to the equipment parameters 135.

Some examples can involve determining, by the computer, a cost associated with the estimated amount of printer consumables; and communicating, by the computer, the cost associated with the estimated amount of printer consumables to the client terminal.

In some examples, the printing system 150 is configured to communicate the equipment parameters 135 to the computer responsive to operator specification of at least one printer parameter.

Some examples can involve receiving, by the computer, a quote request, wherein the quote request specifies sample pages of the print job request; and storing, by the computer, a record that associates the quote request with the equipment parameters 135 in a database.

Some examples can involve receiving, by the computer, a print job request 132 associated with the quote request. In these examples, the computer can search the database for image adjustment parameters associated with the quote request, determine whether the equipment parameters 135 match current equipment parameters 135 used by the printing equipment. Responsive to the equipment parameters 135 not matching the current equipment parameters 135 used by the printing equipment, the computer can configure the printing equipment to print the pages associated with the print job request according to the image adjustment parameters.

In some examples, the database further associates the estimated amount of printer consumables with the quote request.

Some examples can involve receiving, by the computer, information that specifies an actual amount of printer consumables associated with printing of the print job request. In these examples, the computer can determine a difference between the actual amount of printer consumables and the estimated amount of printer consumables. The computer can further configure the estimation logic 140 to generate the estimated amount of printer consumables required for printing a subsequent print job request based on the equipment parameters 135 and the difference between the actual amount of printer consumables and the estimated amount of printer consumables.

Other operations that can be performed by the printing system 150 and/or the estimation system 102 are described below.

Example operations that can be performed by the printing system 150 and/or the estimation system 102 can involve receiving equipment parameters 135 associated with printing equipment 155 of a printing system 150. The system can determine that the equipment parameters 135 are different from previous equipment parameters 135 used by the printing equipment 155. Responsive to this determination, the system can communicate an alert to an operator that indicates that the equipment parameters are different. The operator can then choose to update the equipment parameters 135 or leave them unchanged. For example, a UI can be presented to an operator of the printing system 150 that facilitates aborting or continuing printing of the print job request 132.

In some examples, the quote record 200 associated with the print job request 132 can be updated to indicate information about the mismatch between equipment parameters 135 of the printing system 150 and those specified in the quote record 200, and/or to indicate whether the equipment parameters 135 were updated.

In some examples, a report can be generated (e.g., printed or displayed on a UI of the FEP 154) before, during, or after the printing of pages associated with a particular print job request 132. The report can specify whether the equipment parameters matched those specified in the corresponding quote record 200.

Example operations that can be performed by the printing system 150 and/or the estimation system 102 can involve randomly selecting pages from pages of the entire print job request 132 and processing these randomly selecting pages through the estimation logic 140 to estimate printer consumable usage associated with the entire print job.

As noted above, example operations that can be performed by the printing system 150 and/or the estimation system 102 can involve receiving information that specifies an actual amount of printer consumables associated with printing of the print job request and determining a difference between the actual amount of printer consumables and the estimated amount of printer consumables. In these examples, the determined difference can be specified in the quote record 200 associated with the print job request 132 and/or can be specified in a job report or a UI that is generated by the printing system 150 and/or the estimation system 102. In some examples, the determined difference can be communicated to one or more systems operated by manufacturers of the printing equipment 155.

An example of the printing system can include a particular printer that supports multiple printer configuration/maintenance settings, and the printer can switch between these configurations.

In some examples, the printing system 150 can implement one or more front-end queues. Each queue can be associated with particular equipment parameters. Print jobs that require a certain configuration of equipment parameters 135 can be routed to a queue that is associated with the same or comparable equipment parameters. In some examples, the quote record 200 associated with a particular print job request can specify a particular queue. When the print job request is to be printed, if the currently configured queue does not match the queue specified in the corresponding quote record 200, an alert to an operator can be generated and/or the printing system 150 can be automatically configured to select the queue specified in the quote record 200.

FIG. 9 illustrates an example of a computer system 900 that can form part of or implement any of the systems and/or devices described above. The computer system 900 can include a set of instructions 945 that the processor 905 can execute to cause the computer system 900 to perform any of the operations described above. An example of the computer system 900 can operate as a stand-alone device or can be connected, e.g., using a network, to other computer systems or peripheral devices.

In a networked example, the computer system 900 can operate in the capacity of a server or as a client computer in a server-client network environment, or as a peer computer system in a peer-to-peer (or distributed) environment. The computer system 900 can also be implemented as or incorporated into various devices, such as a personal computer or a mobile device, capable of executing instructions 945 (sequential or otherwise), causing a device to perform one or more actions. Further, each of the systems described can include a collection of subsystems that individually or jointly execute a set, or multiple sets, of instructions to perform one or more computer operations.

The computer system 900 can include one or more memory devices 910 communicatively coupled to a bus 920 for communicating information. In addition, code operable to cause the computer system to perform operations described above can be stored in the memory 910. The memory 910 can be random-access memory, read-only memory, programmable memory, hard disk drive, or any other type of memory or storage device.

The computer system 900 can include a display 930, such as a liquid crystal display (LCD), a cathode ray tube (CRT), or any other display suitable for conveying information. The display 930 can act as an interface for the user to see processing results produced by processor 905.

Additionally, the computer system 900 can include an input device 925, such as a keyboard or mouse or touchscreen, configured to allow a user to interact with components of system 900.

The computer system 900 can also include a disk or optical drive unit 915. The drive unit 915 can include a computer-readable medium 940 in which the instructions 945 can be stored. The instructions 945 can reside completely, or at least partially, within the memory 910 and/or within the processor 905 during execution by the computer system 900. The memory 910 and the processor 905 also can include computer-readable media as discussed above.

The computer system 900 can include a communication interface 935 to support communications via a network 950. The network 950 can include wired networks, wireless networks, or combinations thereof. The communication interface 935 can enable communications via any number of communication standards, such as 802.11, 802.12, 802.20, WiMAX, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A computer-implemented method comprising:
   receiving, by a computer, equipment parameters associated with printing equipment of a printing system;
   determining, by the computer, that the equipment parameters are different from previous equipment parameters used by the printing equipment;
   configuring, by the computer and in response to determining that the equipment parameters are different, estimation logic to generate an estimated amount of printer consumables required for printing pages of a print job request based on the equipment parameters;
   communicating, by the computer, the estimated amount of printer consumables required for printing the pages of the print job request to a client terminal;
   receiving, by the computer, a quote request, wherein the quote request specifies sample pages of the print job request;
   storing, by the computer, a record in a database to associate the quote request with the equipment parameters;
   receiving, by the computer, a print job request associated with the quote request;
   searching, by the computer, the database for equipment parameters associated with the quote request;
   determining, by the computer, whether the equipment parameters match current equipment parameters associated with the printing equipment of the printing system; and
   responsive to the equipment parameters not matching the current equipment parameters associated with the printing equipment, configuring, by the computer, the printing equipment to print the pages associated with the print job request according to the equipment parameters.

2. The computer-implemented method according to claim 1, wherein the equipment parameters specify one or more of: image rasterization parameters and printer maintenance parameters.

3. The computer-implemented method according to claim 1, wherein the estimation logic is configured to rasterize one or more pages of the print job request according to at least some of the equipment parameters.

4. The computer-implemented method according to claim 1, further comprising:
   determining, by the computer, a cost associated with the estimated amount of printer consumables; and
   communicating, by the computer, the cost associated with the estimated amount of printer consumables to the client terminal.

5. The computer-implemented method according to claim 1, wherein the printing system is configured to communicate the equipment parameters to the computer responsive to operator specification of at least one printer parameter.

6. The computer-implemented method according to claim 1, wherein the record further associates the estimated amount of printer consumables with the quote request.

7. A computer-implemented method comprising:
   receiving, by a computer, equipment parameters associated with printing equipment of a printing system;
   determining, by the computer, that the equipment parameters are different from previous equipment parameters used by the printing equipment;
   configuring, by the computer and in response to determining that the equipment parameters are different, estimation logic to generate an estimated amount of printer consumables required for printing pages of a print job request based on the equipment parameters;
   communicating, by the computer, the estimated amount of printer consumables required for printing the pages of the print job request to a client terminal;
   receiving, by the computer, a quote request, wherein the quote request specifies sample pages of the print job request;
   storing, by the computer, a record in a database to associate the quote request with the equipment parameters, wherein the record further associates the estimated amount of printer consumables with the quote request;
   receiving, by the computer, information that specifies an actual amount of printer consumables associated with printing of the print job request;
   determining, by the computer, a difference between the actual amount of printer consumables and the estimated amount of printer consumables; and
   further configuring, by the computer, the estimation logic to generate the estimated amount of printer consumables required for printing a subsequent print job request based on the equipment parameters and the difference between the actual amount of printer consumables and the estimated amount of printer consumables.

8. A system comprising:
   a network interface;
   a memory that stores instruction code; and
   a processor in communication with the memory and the network interface, wherein the instruction code is executable by the processor to perform operations comprising:
   receiving equipment parameters associated with printing equipment of a printing system;
   determining that the equipment parameters are different from previous equipment parameters used by the printing equipment;
   configuring, in response to determining that the equipment parameters are different, estimation logic to generate an estimated amount of printer consumables required for printing pages of a print job request based on the equipment parameters;
   communicating the estimated amount of printer consumables required for printing the pages of the print job request to a client terminal;
   receiving a quote request, wherein the quote request specifies sample pages of the print job request;
   storing a record in a database to associate the quote request with the equipment parameters;
   receiving a print job request associated with the quote request;
   searching the database for equipment parameters associated with the quote request;
   determining whether the equipment parameters match current equipment parameters associated with the printing equipment of the printing system; and
   responsive to the equipment parameters not matching the current equipment parameters associated with the printing equipment, configuring the printing equipment to print the pages associated with the print job request according to the equipment parameters.

9. The system according to claim 8, wherein the equipment parameters specify one or more of: image rasterization parameters, and printer maintenance parameters.

10. The system according to claim 8, wherein the estimation logic is configured to rasterize one or more pages of the print job request according to at least some of the equipment parameters.

11. The system according to claim 8, wherein the instruction code is executable by the processor to perform further operations comprising:
    determining a cost associated with the estimated amount of printer consumables; and
    communicating the cost associated with the estimated amount of printer consumables to the client terminal.

12. The system according to claim 8, wherein the printing system is configured to communicate the equipment parameters to the system responsive to operator specification of at least one printer parameter.

13. The system according to claim 8, wherein the record further associates the estimated amount of printer consumables with the quote request.

14. The system according to claim 13, wherein the instruction code is executable by the processor to perform further operations comprising:
    receiving information that specifies an actual amount of printer consumables associated with printing of the print job request;
    determining a difference between the actual amount of printer consumables and the estimated amount of printer consumables; and
    further configuring the estimation logic to generate the estimated amount of printer consumables required for printing a subsequent print job request based on the equipment parameters and the difference between the actual amount of printer consumables and the estimated amount of printer consumables.

* * * * *